United States Patent
Okada et al.

(10) Patent No.: US 8,978,804 B2
(45) Date of Patent: Mar. 17, 2015

(54) BATTERY BOX

(71) Applicants: Mitsubishi Jidosha Kogyo Kabushiki Kaisha, Tokyo (JP); Mitsubishi Jidosha Engineering Kabushiki Kaisha, Okazaki-shi, Aichi (JP)

(72) Inventors: Hideo Okada, Anjo (JP); Hideki Takeuchi, Kariya (JP)

(73) Assignees: Mitsubishi Jidosha Kogyo Kabushiki Kaisha, Tokyo (JP); Mitsubishi Jidosha Engineering Kabushiki Kaisha, Okazaki-Shi (JP)

(*) Notice: Subject to any disclaimer, the term of this patent is extended or adjusted under 35 U.S.C. 154(b) by 0 days.

(21) Appl. No.: 13/947,710

(22) Filed: Jul. 22, 2013

(65) Prior Publication Data

US 2014/0020969 A1 Jan. 23, 2014

(30) Foreign Application Priority Data

Jul. 23, 2012 (JP) ................................ 2012-163046

(51) Int. Cl.
*B60R 16/04* (2006.01)
*H01M 2/10* (2006.01)

(52) U.S. Cl.
CPC .............. *B60R 16/04* (2013.01); *H01M 2/1083* (2013.01); *H01M 2/1072* (2013.01)
USPC .......................................... 180/68.5; 429/100

(58) Field of Classification Search
CPC ............. B60K 1/04; B60K 2001/0416; B60K 2001/0438; B62D 25/20; B60R 16/04; H01M 2/1083
USPC ................. 180/68.5; 429/96, 100; 296/181.3, 296/184.1, 193.07
See application file for complete search history.

(56) References Cited

U.S. PATENT DOCUMENTS

| 4,058,182 | A | * | 11/1977 | Huber | 180/274 |
| D262,104 | S | * | 12/1981 | Simpson | D13/119 |
| 6,230,834 | B1 | * | 5/2001 | Van Hout et al. | 180/68.5 |
| 6,290,013 | B1 | * | 9/2001 | Bienenstein, Jr. | 180/68.5 |
| 7,413,045 | B2 | * | 8/2008 | Tien | 180/68.5 |
| 8,186,468 | B2 | * | 5/2012 | Parrett et al. | 180/68.1 |
| 8,186,735 | B2 | * | 5/2012 | Maceri et al. | 296/37.14 |
| 8,231,164 | B2 | * | 7/2012 | Schubring et al. | 296/37.14 |
| 8,505,662 | B2 | * | 8/2013 | Schwarz et al. | 180/68.5 |
| 2008/0169676 | A1 | * | 7/2008 | Hanson et al. | 296/187.01 |
| 2011/0262801 | A1 | * | 10/2011 | Schwab | 429/163 |
| 2012/0160585 | A1 | * | 6/2012 | Mildner | 180/68.5 |
| 2013/0161105 | A1 | * | 6/2013 | Maguire et al. | 180/68.5 |
| 2013/0333967 | A1 | * | 12/2013 | Meier | 180/68.5 |

FOREIGN PATENT DOCUMENTS

| JP | 8-10029 Y2 | 3/1996 |
| JP | 2007-45281 A | 2/2007 |

* cited by examiner

*Primary Examiner* — John Walters
*Assistant Examiner* — Brian Swenson
(74) *Attorney, Agent, or Firm* — Birch, Stewart, Kolasch & Birch, LLP

(57) ABSTRACT

A battery box includes a flange, a side wall and a bottom wall. The flange is connected to an inner peripheral edge of an installation hole formed in a floor panel of a vehicle. The side wall gently continues with the flange, and is extended downward. The bottom wall, has a periphery gently continuing with the side wall, and is formed with at least one open hole in a center of the bottom wall. Seat portions are projected upper than the bottom wall. At least one seat portion is disposed at each both sides of the open hole. A bottom cover closes the open hole. A corner portion gently continues with the side wall and the bottom wall forming curved surface. A center of curvature of the curved surface is set inside a corner of a battery to be placed on the seat portions.

9 Claims, 5 Drawing Sheets

BATTERY BOX

BACKGROUND

The invention relates to a battery box for storing a battery to be mounted on a vehicle.

A battery to be mounted on a vehicle is stored in an engine room. As shown in the patent document 1, in a van type of vehicle, sometimes, the battery is also stored in such portion of a rear floor as exists near the lower front portion thereof. In both cases, the battery must be disposed and structured so as to be protected against rainwater, mud splash and the like.

In the case that the battery is disposed in the engine room of a vehicle of a type that an engine is mounted on the front portion thereof, a battery installation portion is often disposed in front of or in rear of a tire house of front wheels. This position is sufficiently distant from a road and is hard to suffer directly from rainwater, mud splash and the like. Therefore, as the installation portion, there is employed a tray the rising portion of the outer peripheral edge of which is short.

In the case that the battery is disposed on the rear floor, as in the patent documents 1 and 2, an open window is formed in a floor panel and the battery is mounted onto the rear floor. In this case, there must be employed a structure which can prevent water or the like from invading into the vehicle through the open window. In order to reduce such portion of the battery as projects toward a vehicle room, the battery is installed in such a manner that a portion thereof exists lower than the floor panel.

In the patent document 1, the rear floor is constituted of an upper panel and a lower panel, while a battery box having flanges is mounted on a mounting hole formed in the lower panel. A battery stored in the battery box is held down toward the lower panel by an exclusive holder to thereby bring the flanges of the battery box into engagement with the lower panel. Also, the upper panel has a battery hole formed above the battery box and a lid is mounted on the battery hole with a packing between them.

In the patent document 2, a tray is mounted over two cross members respectively disposed on the lower surface of the floor panel and, on this tray, there is placed a box-shaped battery cover for storing a battery. This battery cover is formed higher than the upper surface of the battery. The battery is fixed to the tray by a battery band or the like mounted through penetration holes respectively formed in the front and rear walls of the battery cover. A service hole is formed in the floor panel situated above the battery, and a lid is mounted on this service hole with a seal member between them. In the patent document 2, the tray protects the battery from water and mud splashed by front wheels, while the battery cover protects the battery from water and mud splashed by rear wheels.

However, in the patent document 1, the flange of the battery box and lower panel are only contacted with each other but are not perfectly sealed. This battery box constitutes a portion of a structure for holding a spare tire mounted under a vehicle body and, therefore, when force for pushing up the spare tire is strong, there is a possibility that clearances can be produced between the flanges of the battery box and lower panel. Also, in the patent document 2, the battery cover includes, in its front and rear walls, a hole for passing a battery band and a hole for passing a cable which are used to hold the battery. Therefore, when water or mud is splashed from the side portions of the tray, such water or mud is easy to invade into the battery cover from the holes formed in the front and rear walls of the battery cover.

In both of the battery box of the patent document 1 and the battery cover of the patent document 2, a sufficient space must be secured under the rear floor. In the case that an opening is formed in the floor panel, the strength of the floor panel is lowered accordingly and, therefore, the area of the opening must be reduced as much as possible. In order to store the battery in a small area, preferably, the battery box may have a simple structure and a clearance between the battery and it may be small. In the case that the battery box is molded using resin, it can also be produced to the shape of the battery. However, when the strength and assembling operation thereof are taken into consideration, it is lower in cost to employ a press-formed product of a metal plate.

In the case that a box-shaped battery box is produced by press molding, it is molded by deep drawing and, therefore, it is restricted by the limit drawing that is allowed in the corner portion of the battery box. That is, in order to store the battery in the battery box in such a manner that the corners of the battery do not interfere with the corner portions of the battery box, there is necessary such battery box that has a larger clearance in the whole periphery thereof at least than the smallest radius of curvature in the limit drawing of material used with respect to the outer shape of the battery. This increases the size of the opening of the floor panel that is prepared in order to mount this battery box.

[Patent Document 1] JP 8-10029 U
[Patent Document 2] JP 2007-45281 A

SUMMARY

It is therefore one advantageous aspect of the present invention to provide a battery box which can prevent water and mud from invading therein from the lower portion of a vehicle and can make smaller the opening of the battery box than the dimension of the battery box when restricted by limit drawing.

According to one aspect of the invention, there is provided a battery box, comprising:

a flange configured to be connected to an inner peripheral edge of an installation hole formed in a floor panel of a vehicle;

a side wall, gently continuing with the flange, and extended downward;

a bottom wall, having a periphery gently continuing with the side wall, and formed with at least one open hole in a center of the bottom wall;

seat portions projected upper than the bottom wall, wherein at least one seat portion is disposed at each both sides of the open hole;

a bottom cover closing the open hole; and a corner portion gently continuing with the side wall and the bottom wall forming curved surface, wherein a center of curvature of the curved surface is set inside a corner of a battery to be placed on the seat portions.

In the battery box, an outer peripheral edge of the flange may be covered with a sealing material so as to straddle to the floor panel.

In the battery box, a peripheral edge of the open hole formed in the bottom wall may be projected lower than the bottom wall.

In the battery box, an outer peripheral edge of the bottom cover may be covered with a sealing material so as to straddle to the bottom wall in a state where the bottom cover is mounted on the open hole.

In the battery box, at least a portion of the flange may be connected to the floor panel together with a reinforcing member disposed on a lower portion of the floor panel.

In the battery box, the seat portions may be disposed in such a manner that a center of gravity of the battery is set inside an area which is circumscribed to all of the seat portions.

DETAILED DESCRIPTION OF EXEMPLIFIED EMBODIMENTS

Figure 1:
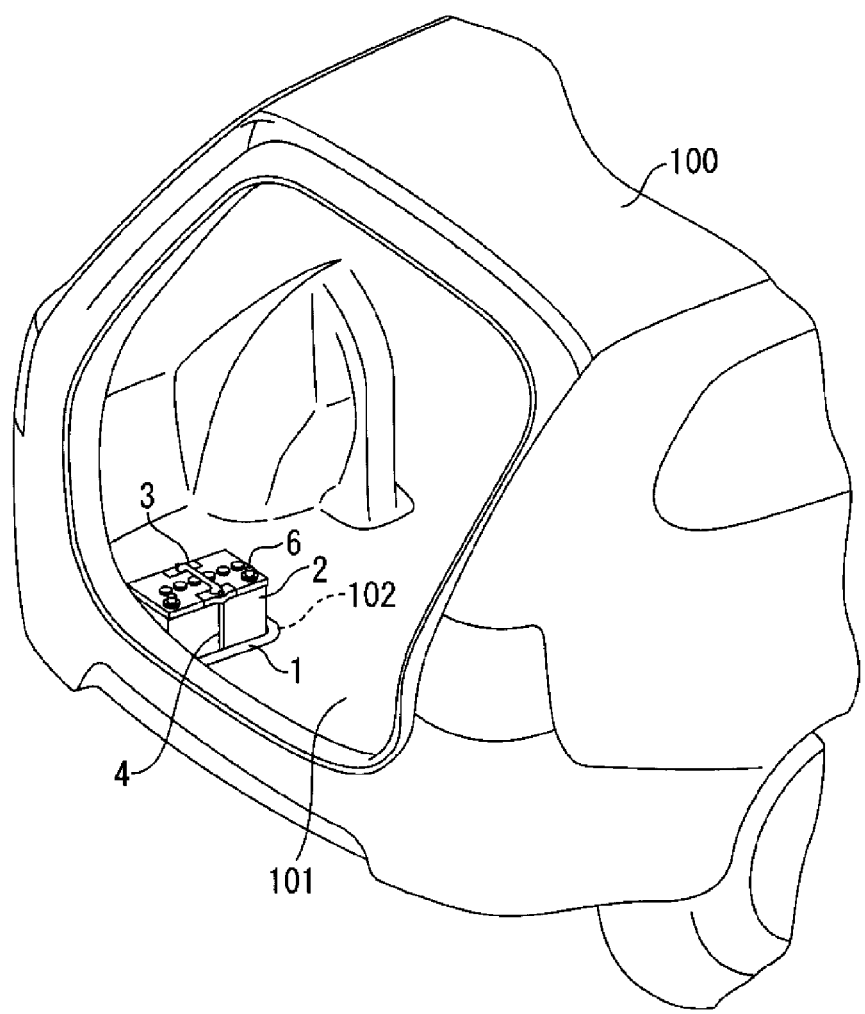
FIG. 1 is a perspective view of the rear portion of a vehicle equipped with a battery box according to an embodiment of the invention.
Figure 2:
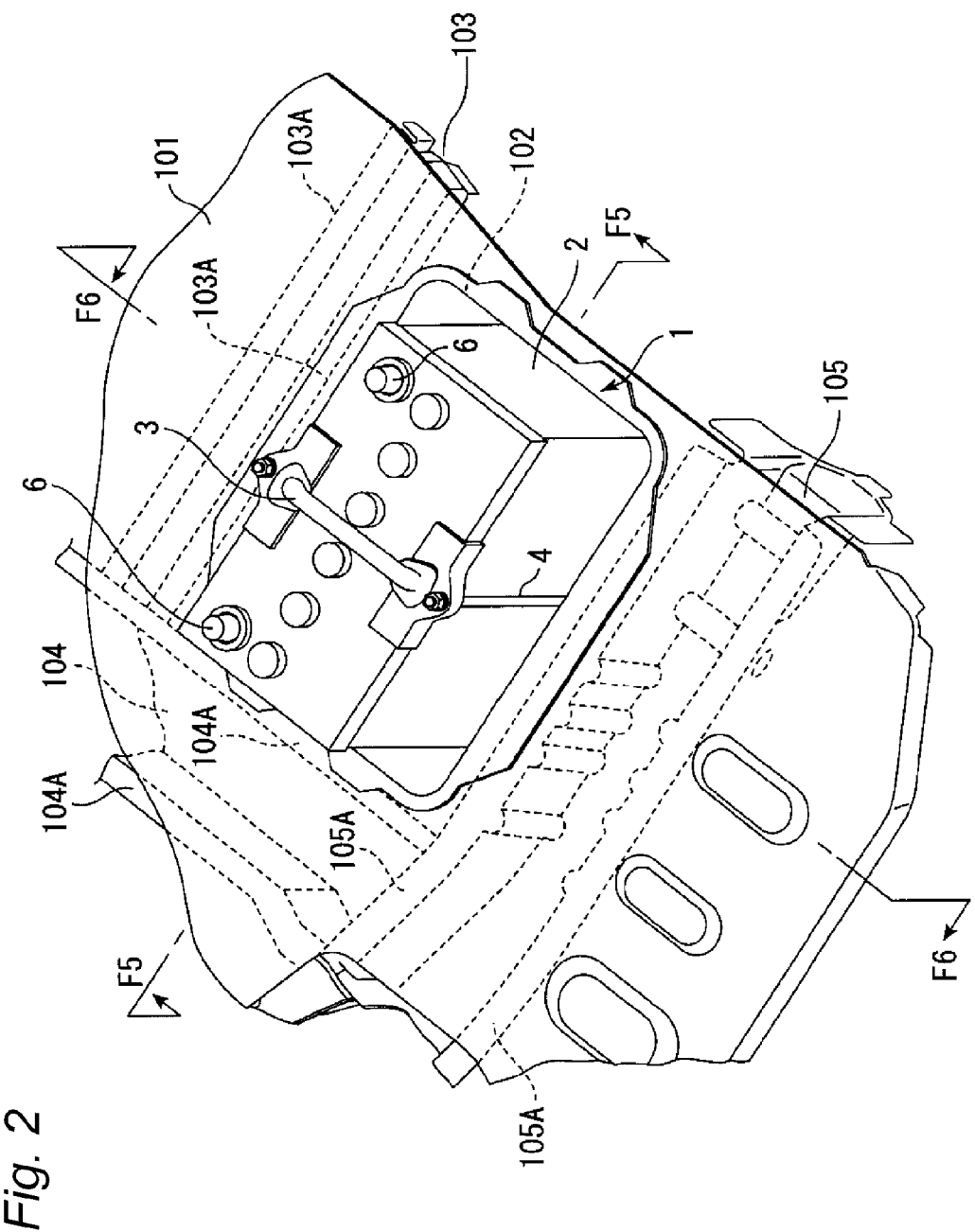
FIG. 2 is an enlarged perspective view of the battery box peripheral portion of FIG. 1.
Figure 3:
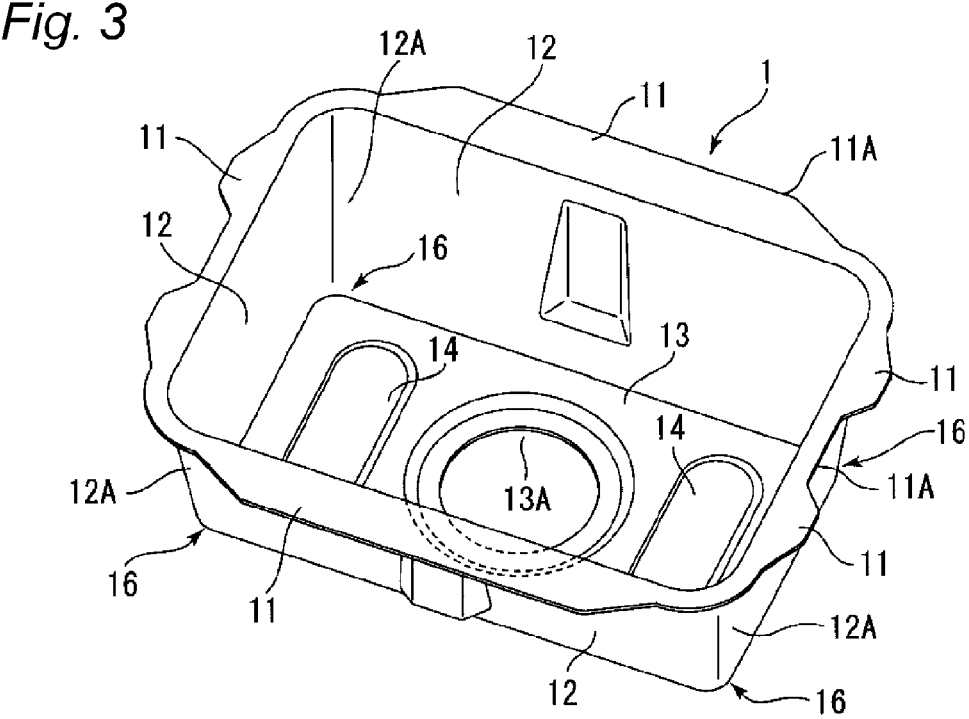
FIG. 3 is a perspective view of the battery box of FIG. 2.
Figure 4:
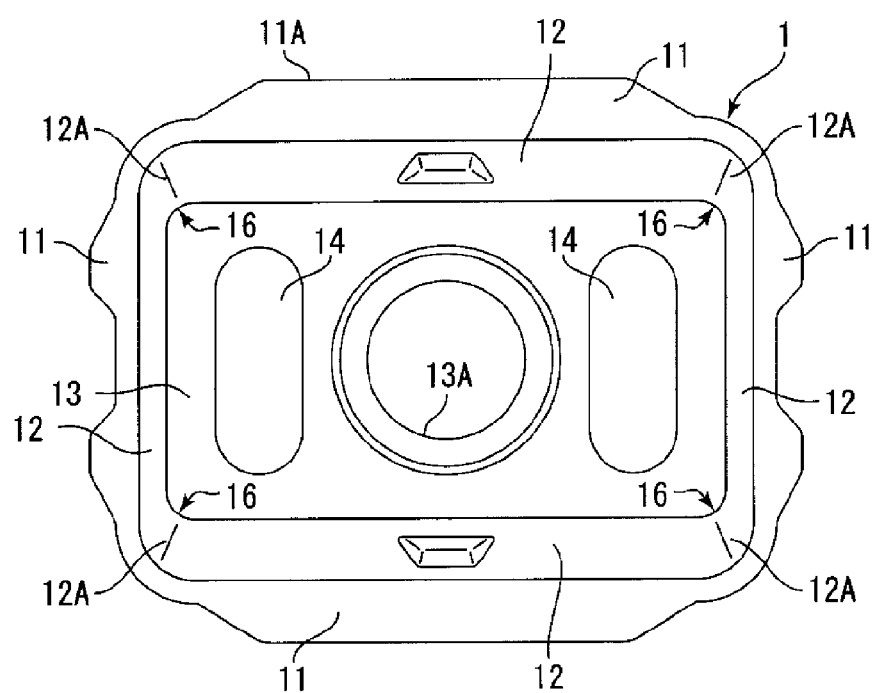
FIG. 4 is a plan view of the battery box of FIG. 3 viewed from above.
Figure 5:
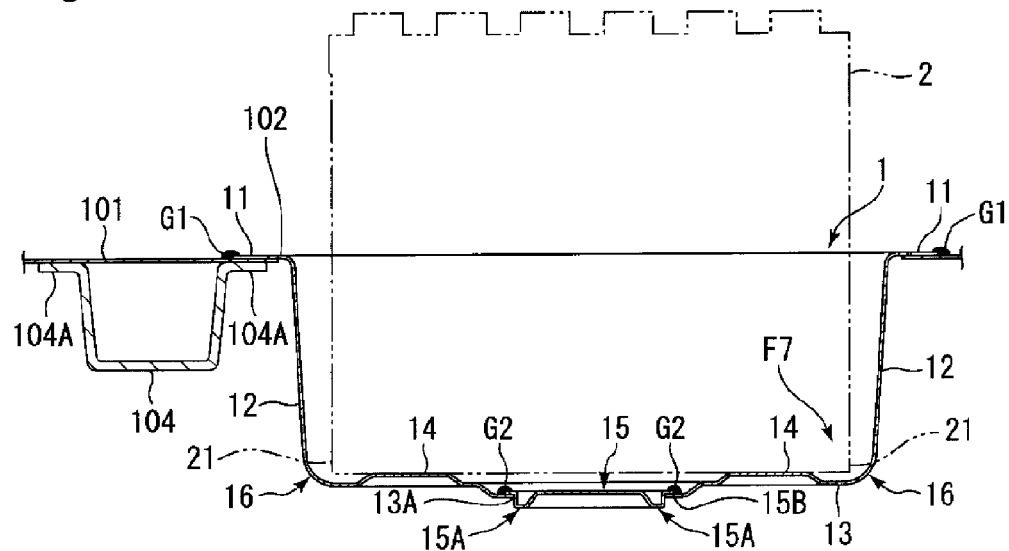
FIG. 5 is a section view of the battery box, taken along the F5-F5 line shown in FIG. 2.
Figure 6:
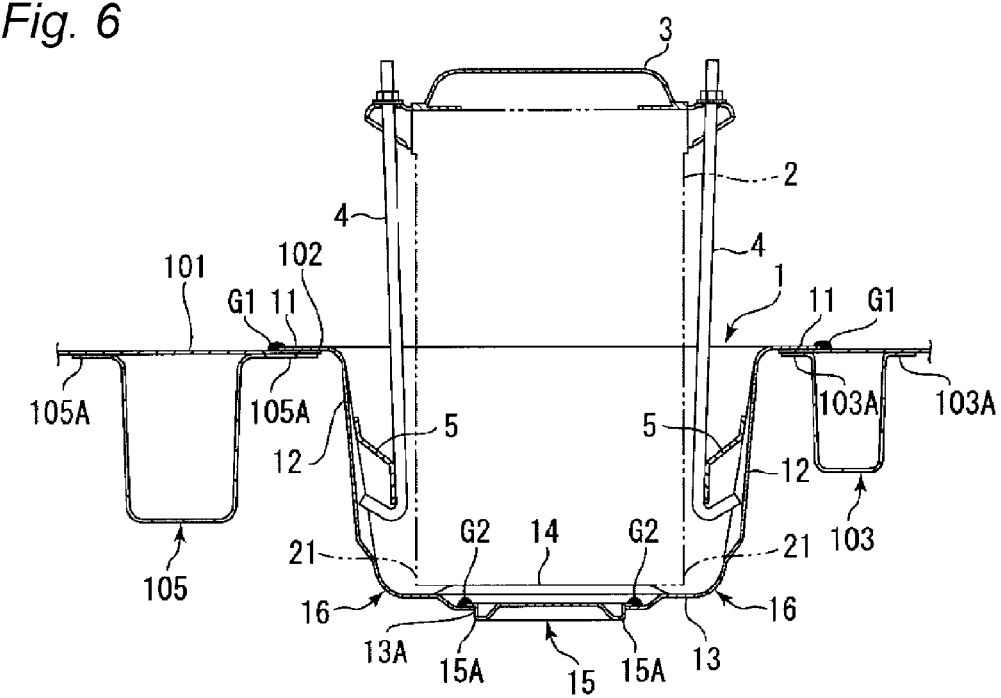
FIG. 6 is a section view of the battery box, taken along the F6-F6 line shown in FIG. 2.

Now, description is given of a battery box 1 according to an embodiment of the invention with reference to FIGS. 1 to 7. FIG. 1 shows the rear portion of a vehicle 100 equipped with the battery box 1. The battery box 1 has such a size with respect to a floor panel 101 disposed on the rear portion of the vehicle 100 that, as shown in FIGS. 5 and 6, a substantially lower half of a battery 2 to be stored is buried below the floor panel 101. The battery 2 stored in the battery box 1 as shown in FIGS. 1 and 2 is fixed by a fixing metal member 3 and a hook bolt 4 as shown in FIG. 6. The hook bolt 4 is put on an anchor bracket 5 mounted within the battery box 1. Here, in FIG. 1, the upper portion of the battery 2 stored in the battery box 1 is exposed to the inside of a vehicle room, whereas cables are connected to electrodes 6 and they are covered with insulating members, respectively.

The battery box 1, as shown in FIGS. 3 and 4, is integrally molded into a bucket-like shape by forming a steel plate with a deep drawing. The battery box 1 includes flange 11, side walls 12, a bottom wall 13, seat portions 14, a bottom cover 15 and corner portions 16.

The flange 11, as shown in FIGS. 2, 5 and 6, is connected to the inner peripheral edge of an installation hole 102 opened up in the floor panel 101 of the vehicle 100. In this embodiment, in three portions surrounding the battery box 1, there are arranged reinforcing members 103, 104 and 105 respectively for supporting the floor panel 101. The reinforcing members 103, 104 and 105 are spot welded to the floor panel 101 through their respective flanges 103A, 104A and 105A. In this case, such ranges of the battery box 1 as overlap with the flange 11 are spot welded in three layers together with the floor panel 101.

Also, the outer peripheral edge 11A of the flange 11 of the battery box 1 connected to the installation hole 102, as shown in FIGS. 5 and 6, is covered with sealing materials G1 applied so as to straddle the whole periphery of the floor panel 101. Due to this, a clearance between the battery box 1 and floor panel 101 can be sealed positively.

The side walls 12, as shown in FIGS. 3 to 6, respectively extend downward and gently continuing from the flange 11. Since the battery box 1 is molded integrally by deep drawing, as shown in FIGS. 4, 5 and 6, the side walls 12 are inclined to be tapered so that a distance between them narrows from the flange 11 toward the bottom wall 13. The continuing portions 12A of the side walls 12 surrounding the side surfaces of the battery 2, as shown in FIGS. 3 and 4, are formed as gently curved surfaces (cylindrical surfaces).

The periphery of the bottom wall 13, as shown in FIGS. 3, 5 and 6, continues gently with the side walls 12 and the bottom wall 13 has at least an open hole 13A formed in its central portion. The battery box 1 has been connected to the floor panel 101 in a process to be executed before a painting process and is painted simultaneously when a vehicle body is painted. The painting process is executed by immersing the whole vehicle body in a pool containing paint therein.

The open hole 13A is used to take in the paint quickly without producing stagnant air when the vehicle body is immersed in the paint and is also used to discharge the paint quickly when the vehicle body is pulled up from the paint. Therefore, two or more open holes 13A may also be formed. Also, the periphery of the open hole 13A projects below the bottom wall 13.

The seat portions 14, as shown in FIGS. 5 and 6, project upper than the bottom wall 13. At least one seat portion 14 is arranged on the bottom wall 13 at each both sides of the open hole 13A arranged centrally thereof. The seat portions 14 are arranged so that a center of gravity of the battery 2 exists within an area which is circumscribed to all seat portions 14.

The bottom cover 15 includes an annular-shaped projecting portion 15A engageable with the inner periphery of the open hole 13A and can be engaged into the open hole 13A from above the bottom wall 13. The outer peripheral edge 15B of the bottom cover 15 is covered with a sealing material G2 applied so as to straddle to the whole periphery of the bottom wall 13. Therefore, the open hole 13A of the bottom wall 13 of the battery box 1 can be certainly covered.

Figure 7:
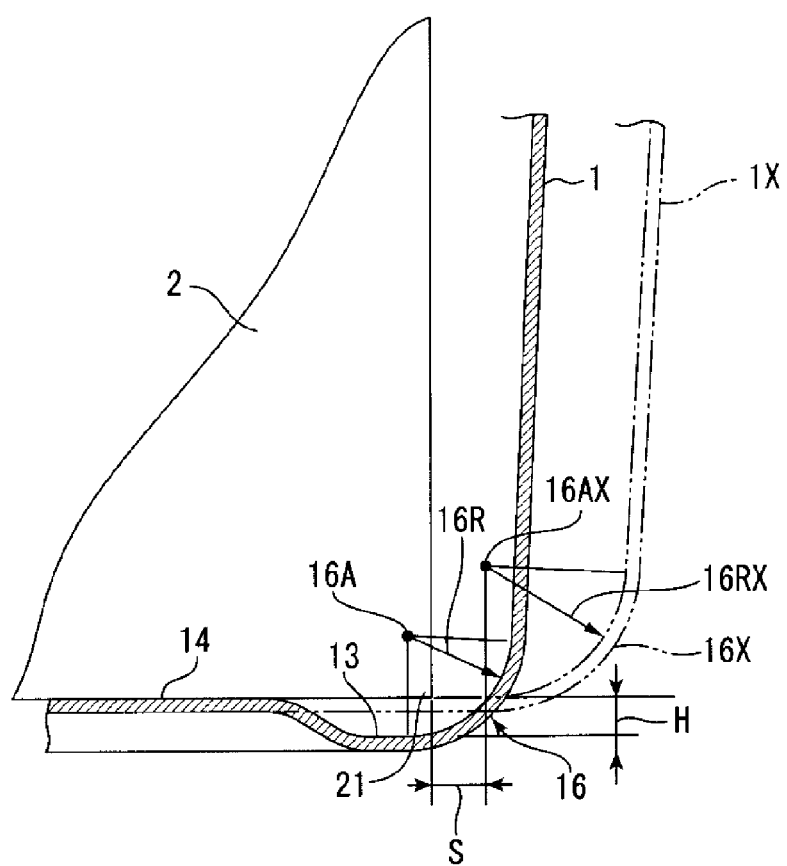
FIG. 7 is a section view of the F7 portion shown in FIG. 5, showing a comparison between the outer shape thereof and the outer shape of a battery box which does not include seat portions.

The corner portions 16 respectively provide curved surfaces which gently lead to the side walls 12 and bottom wall 13. In each corner portion 16, as shown in FIG. 7, the center 16A of the radius of curvature 16R of the curved surface is set inside the corner 21 of the battery 2 to be placed on the seat portion 14. Therefore, a transition from the bottom wall 13 to the corner portion 16, that is, the starting point of the curved surface forming the corner portion 16 can be set inside the allowance S of an assembling tolerance based on the corner 21 of the bottom portion of the battery 2. In other words, on a plane where the upper surface of the seat portion 14 exists, the center 16A of the radius of curvature 16R may be set in such a manner that the allowance S of the assembling tolerance can be secured. Therefore, in the case that the smallest bending radius when molding the battery box 1 by deep drawing is larger than a dimension corresponding to the sum of the allowance S of the assembling tolerance and the height H of the seat portion 14, the center 16A of the radius of curvature 16R is set inside the corner 21 of the battery 2. For the smallest bending radius smaller than the dimension corresponding to the sum of the allowance S of the assembling tolerance and the height H of the seat portion 14, the center 16A of the radius of curvature 16R is set to be outwardly of the corner 21 of the battery 2 and within the range of the allowance S of the assembling tolerance.

In the case that the battery box 1 is molded into a box shape to the outer shape of the battery by deep drawing, the smallest bending radius allowed for the corner portion 16 is restricted by limit drawing. In the case of the conventional battery box 1X the bottom wall 13 of which does not include the seat portions 14, as shown in FIG. 7, in order for the corner 21 of the battery 2 not to interfere with the corner portion 16X of the battery box 1X, the center 16AX of the radius of curvature 16RX must be set outside the installation area of the battery 2 by an amount corresponding to the allowance S of the assembling tolerance.

On the other hand, in the battery box of the invention, since it includes the seat portions 14 respectively formed to project from the bottom wall 13, the allowance S of the assembling tolerance can be set on a plane where the upper surface of the seat portion 14 exists. Therefore, the centers 16A of the radius of curvature 16R of the curved surfaces forming the corner portions 16 can be set inside the allowance S of the assembling tolerance, in this embodiment, inside the corner 21 of the battery 2. Accordingly, even in the case that, in pressing or molding the battery box 1 integrally by deep drawing, the battery box 1 is restricted by limit drawing, the opening area thereof can be made smaller than the opening area that is necessary in a conventional battery box. As a result of this, the opening area of the floor panel 101 necessary for installation of the battery box 1 can also be reduced.

According to the battery box of the invention, it includes the seat portions respectively projected above the bottom wall and also, due to the corner portions respectively providing curved surfaces the centers of curvature of which are set inside the corners of the battery, the side walls and bottom wall of the battery box are allowed to continue gently with each other. When installing the battery, an allowance with an assembling tolerance taken into account must be provided in the periphery of the battery. That is, in the case of a structure in which the whole surface of the bottom portion of the battery is contacted with the bottom wall of the battery box, the battery box is formed such that a position where the allowance of the assembling tolerance is set outside the bottom portion of the battery provides the start point of the corner portion. On the other hand, according to the battery box of the invention, since the bottom wall includes the seat portions, the corners of the bottom portion of the battery are disposed distant from the bottom wall of the battery box. That is, the start points of the curved surfaces providing the corner portions can be set inside the allowance of the assembling tolerance based on the corner of the bottom portion of the battery. Therefore, even in the case that, when the battery box is molded by deep drawing with the smallest bending radius, the minimum opening area of the battery box is reduced, the corners of the bottom portion of the battery does not touch the corner portions of the battery box. That is, the size of an installation hole to be opened up in the floor panel for mounting the battery box thereon can be reduced. The reduced-size installation hole of the floor panel enhances the strength of the vehicle body. Also, in the case that a metal plate is molded by deep drawing to produce a battery box, the flange of the battery box can be spot welded to the floor panel. That is, the battery box can be mounted onto the floor panel prior to the painting process.

According to the battery box of the invention structured such that the outer peripheral edge of the flange is covered with a sealing material applied so as to straddle to the floor panel, the connecting portion between the floor panel and battery box can be sealed positively.

According to the battery box of the invention structured such that the peripheral edge of the open hole formed in the bottom wall is projected below this bottom wall, when the painting process is executed in a state where the battery box is mounted on the floor panel, the painting liquid can be discharged easily from this open hole.

According to the battery box of the invention structured such that, in a state where the bottom cover is mounted on the opening edge of the battery box, the outer peripheral edge of the bottom cover is covered with a sealing material applied so as to straddle to the bottom wall, the inside of the battery box can be sealed positively.

According to the battery box of the invention structured such that at least a portion of the flange, together with a reinforcing member to be disposed in the lower portion of the floor panel, is connected to the floor panel, the strength of the periphery of an installation hole prepared in the floor panel for mounting the battery box can be increased. Also, this can reduce a process for assembling the battery box.

This patent application is based upon Japanese Patent Application No. 2012-163046 filed on Jul. 23, 2012, the contents of which are incorporated herein byway of reference.

What is claimed is:

1. A battery box for accommodating a battery therein, comprising:
   a flange configured to be connected to an inner peripheral edge of an installation hole formed in a floor panel of a vehicle;
   a side wall, gently continuing with the flange, and extended downward;
   a bottom wall, having a periphery gently continuing with the side wall;
   seat portions projected in an upward direction from the bottom wall and configured to receive a bottom surface of the battery; and
   a corner portion gently continuing with the side wall and the bottom wall forming a curved surface,
   wherein the seat portions are provided at positions away from the corner portion, the curved surface is determined such that the curved surface extends at least 90 degrees from the side wall to the bottom wall, and a radius of curvature of the curved surface is longer than a distance between the side wall and an opposing side surface of the battery placed in the battery box and longer than a distance between the bottom wall and the bottom surface of the battery opposing the bottom wall.

2. The battery box according to claim 1, wherein an outer peripheral edge of the flange is covered with a sealing material so as to straddle to the floor panel.

3. The battery box according to claim 1, wherein a peripheral edge of the open hole formed in the bottom wall is projected lower than the bottom wall.

4. The battery box according to claim 1, wherein an outer peripheral edge of the bottom cover is covered with a sealing material so as to straddle to the bottom wall in a state where the bottom cover is mounted on the open hole.

5. The battery box according to claim 1, wherein at least a portion of the flange is connected to the floor panel together with a reinforcing member disposed on a lower portion of the floor panel.

6. The battery box according to claim 1, wherein the seat portions are disposed in such a manner that a center of gravity of the battery is set inside an area which is circumscribed to all of the seat portions.

7. The battery box according to claim 1, wherein the bottom wall is formed with at least one open hole in a center thereof.

8. The battery box according to claim 7, wherein the seat portions are disposed at both sides of the open hole.

9. The battery box according to claim 7, further comprising:
   a bottom cover closing the open hole.

\* \* \* \* \*